(12) United States Patent
Suzuki

(10) Patent No.: US 8,264,573 B2
(45) Date of Patent: Sep. 11, 2012

(54) IMAGING APPARATUS AND REPRODUCING APPARATUS WHICH CHANGES FRAME RATE BASED ON ZOOM OPERATION

(75) Inventor: Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/778,017

(22) Filed: May 11, 2010

(65) Prior Publication Data

US 2010/0295970 A1 Nov. 25, 2010

(30) Foreign Application Priority Data

May 20, 2009 (JP) ................................. 2009-121535

(51) Int. Cl.
*H04N 5/262* (2006.01)
*H04N 5/225* (2006.01)

(52) U.S. Cl. ................................ 348/240.99; 348/220.1

(58) Field of Classification Search ............. 348/240.99, 348/240.1, 240.2, 240.3; 396/86
See application file for complete search history.

(56) References Cited

U.S. PATENT DOCUMENTS

| | | | |
|---|---|---|---|
| 7,362,352 B2 | 4/2008 | Ueyama | |
| 7,456,875 B2 | 11/2008 | Kashiwa | |
| 2003/0107657 A1* | 6/2003 | Shioji et al. | 348/220.1 |
| 2005/0052553 A1 | 3/2005 | Kido et al. | |
| 2007/0104462 A1 | 5/2007 | Saito et al. | |
| 2008/0043123 A1* | 2/2008 | Shimomura et al. | 348/240.2 |
| 2009/0015707 A1* | 1/2009 | Hibino et al. | 348/347 |
| 2009/0046175 A1* | 2/2009 | Ozawa et al. | 348/231.99 |
| 2010/0039536 A1* | 2/2010 | Dahllof et al. | 348/240.99 |
| 2010/0060752 A1* | 3/2010 | Tokuyama | 348/240.3 |
| 2010/0079620 A1* | 4/2010 | Kuriyama | 348/231.3 |
| 2012/0092525 A1* | 4/2012 | Kusaka | 348/231.99 |

FOREIGN PATENT DOCUMENTS

| | | | |
|---|---|---|---|
| JP | 2002-300457 A | 10/2002 | |
| JP | 2002-354329 A | 12/2002 | |
| JP | 2003-274360 A | 9/2003 | |
| JP | 2004253904 A | * 9/2004 | |
| JP | 2004-357118 A | 12/2004 | |
| JP | 2005-086499 A | 3/2005 | |
| JP | 2007-134991 A | 5/2007 | |
| JP | 2008-005051 A | 1/2008 | |
| JP | 2011119854 A | * 6/2011 | |
| WO | WO 2010017852 A1 | * 2/2010 | |

OTHER PUBLICATIONS

Translation of JP 2008-005051A; Jan. 10, 2008.*

* cited by examiner

*Primary Examiner* — John Villecco
(74) *Attorney, Agent, or Firm* — Carter, DeLuca, Farrell & Schmidt LLP

(57) ABSTRACT

An imaging unit outputs a video signal at a frame rate higher than a standard frame rate. During a zoom operation period or a period including the zoom operation period and periods before and after the zoom operation, a video signal from the imaging unit is recorded in a recording medium at a high recording frame rate. Other than this period, a video signal is recorded in the recording medium at the standard frame rate. The recording frame rate and zoom operation information is recorded as metadata in the recording medium. During reproduction, based on a set reproduction mode, thinning processing is carried out on a video signal recorded during a zoom operation, and the processed signal is output at the standard frame rate. In this way, it is possible to change a frame rate in view of a photographer's intention and assure compatibility with existing viewing and reproduction environments.

7 Claims, 16 Drawing Sheets

FIG.9

| SPECIAL REPRODUCTION EFFECTS | | CHANGE IN ZOOM MAGNIFICATION |
|---|---|---|
| MODE 1 | LINEAR SMOOTHING MODE | CONSTANT ZOOM SPEED |
| MODE 2 | DYNAMIC SHOOTING MODE | GRADUAL CHANGE IN ZOOM SPEED AT THE BEGINNING AND RAPID CHANGE AT THE END |
| MODE 3 | SOFT LANDING MODE | RAPID CHANGE IN ZOOM SPEED AT THE BEGINNING AND GRADUAL CHANGE AT THE END |
| MODE 4 | SLOW MOTION MODE | ALL THE FRAMES RECORDED AT HIGH RATE ARE REPRODUCED |
| MODE 5 | SKIP MODE | REPRODUCED WITHOUT FRAMES RECORDED BY ERRONEOUS ZOOM OPERATION |

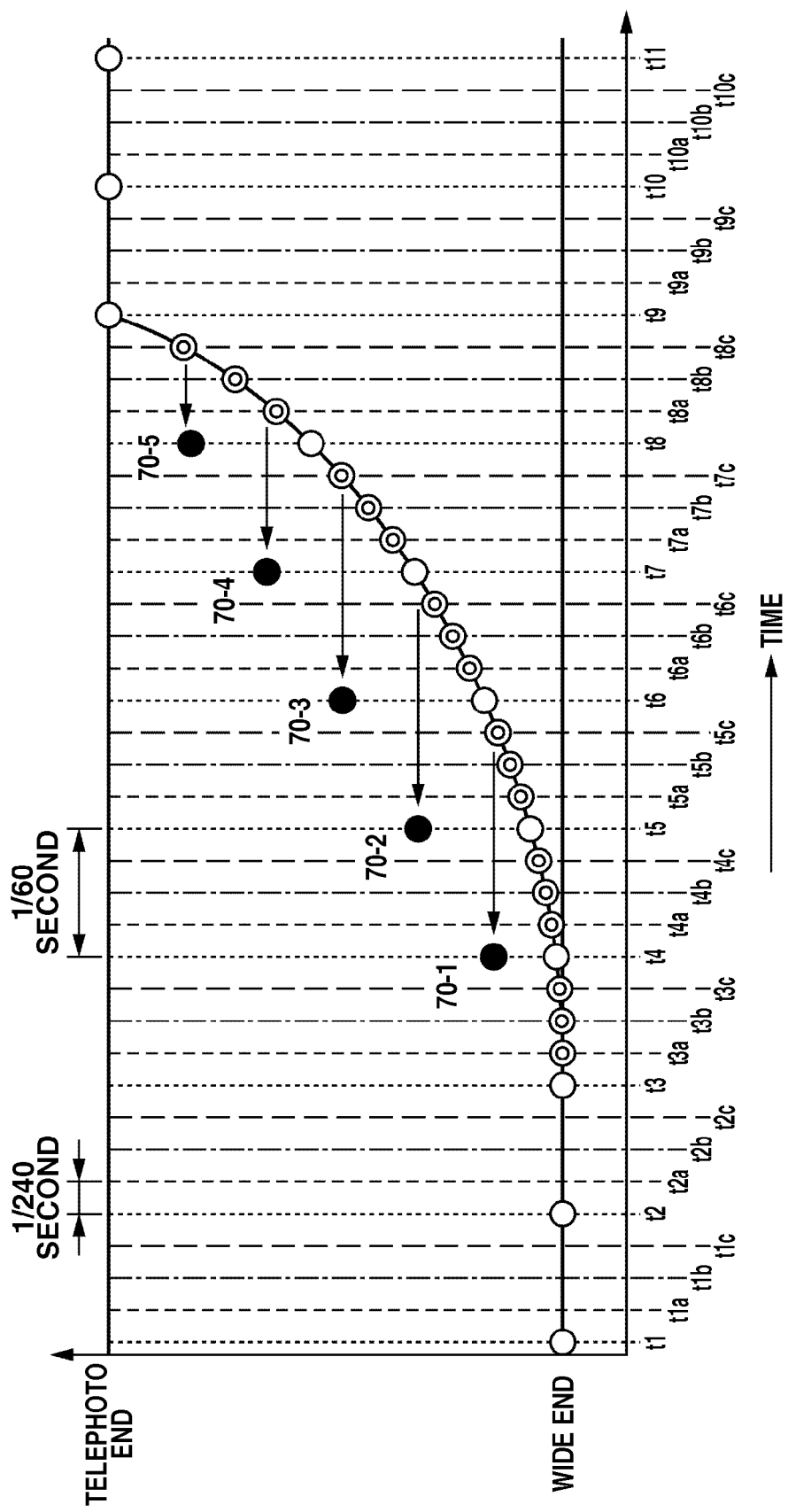

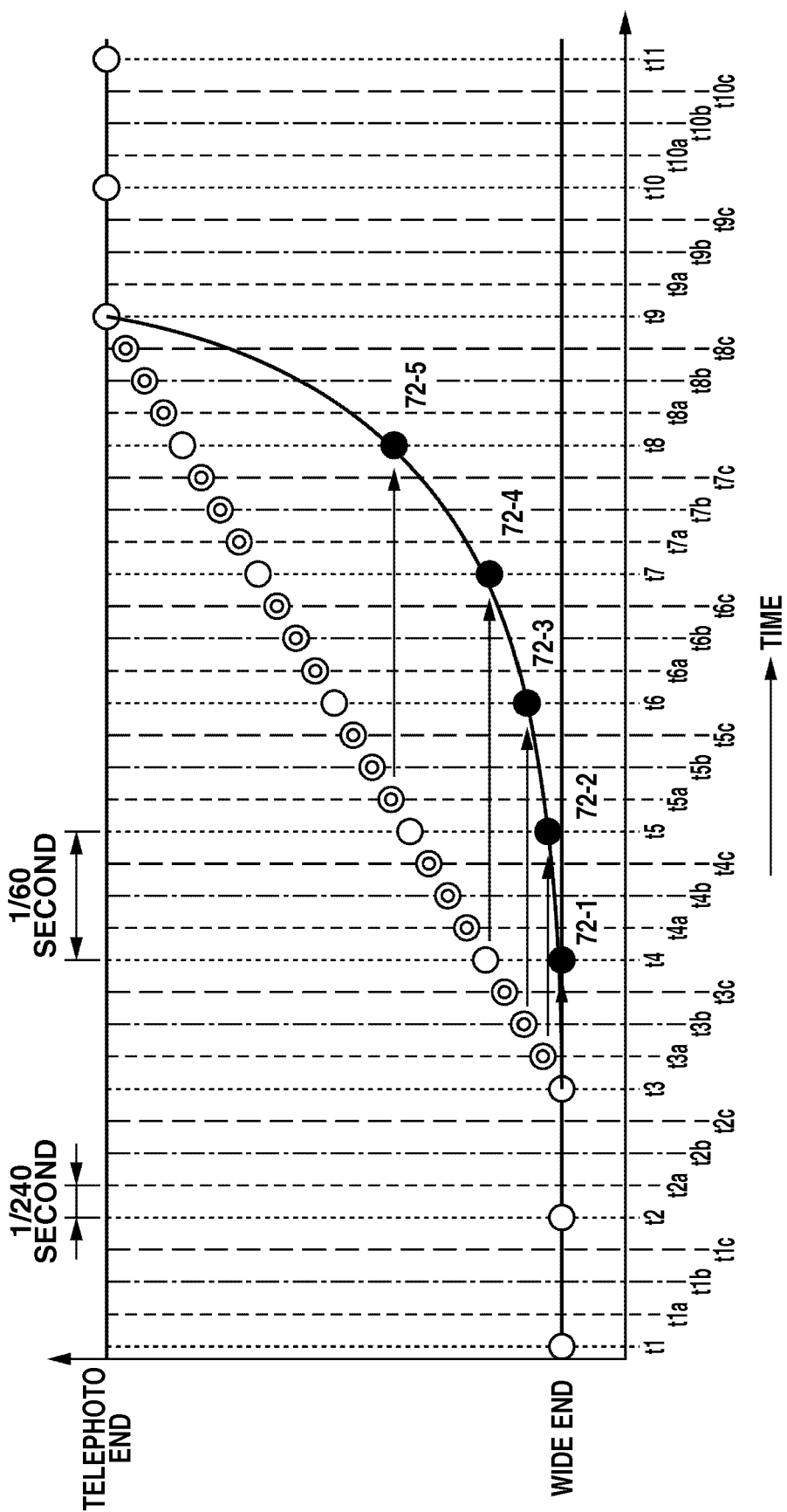

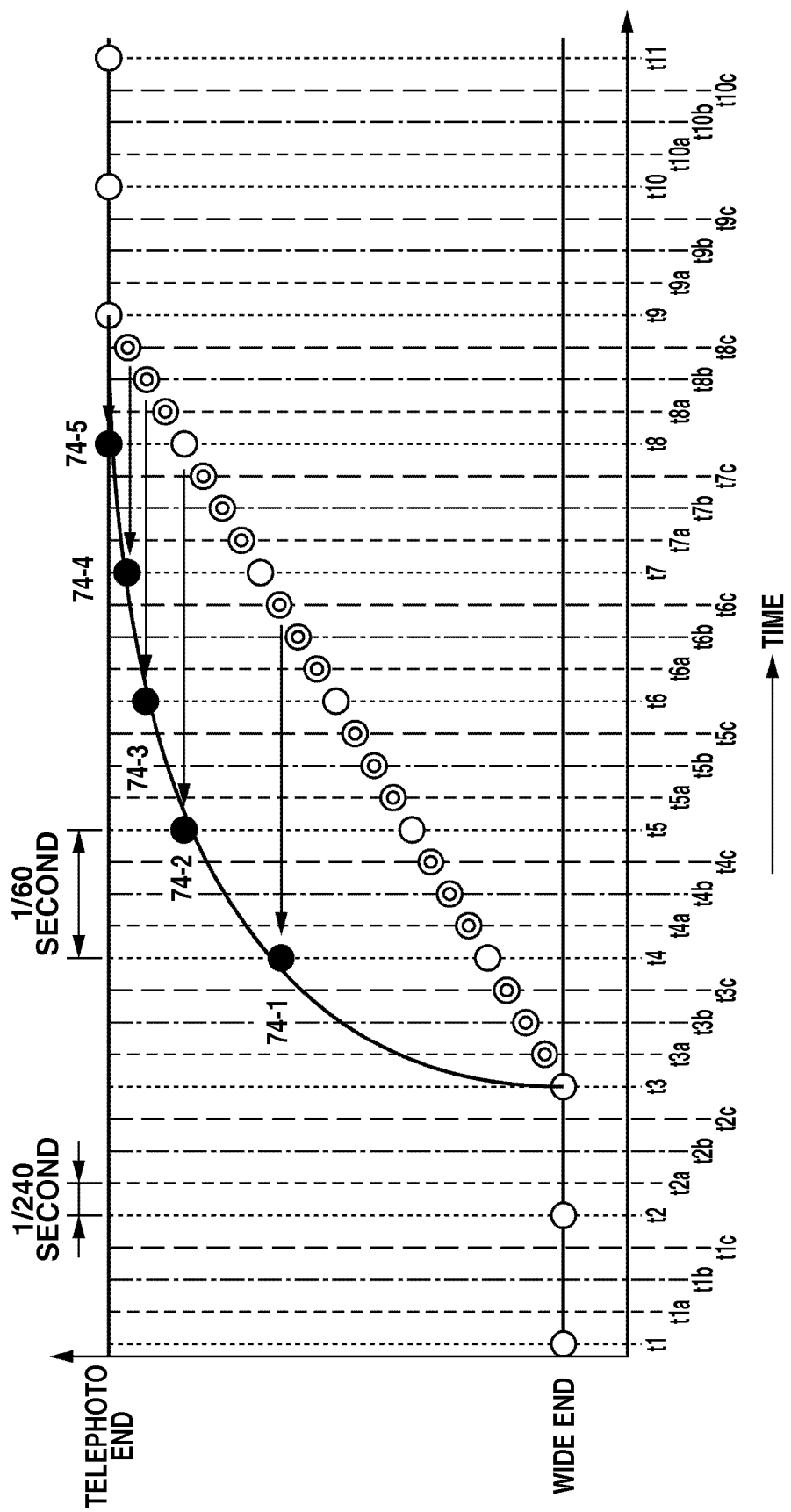

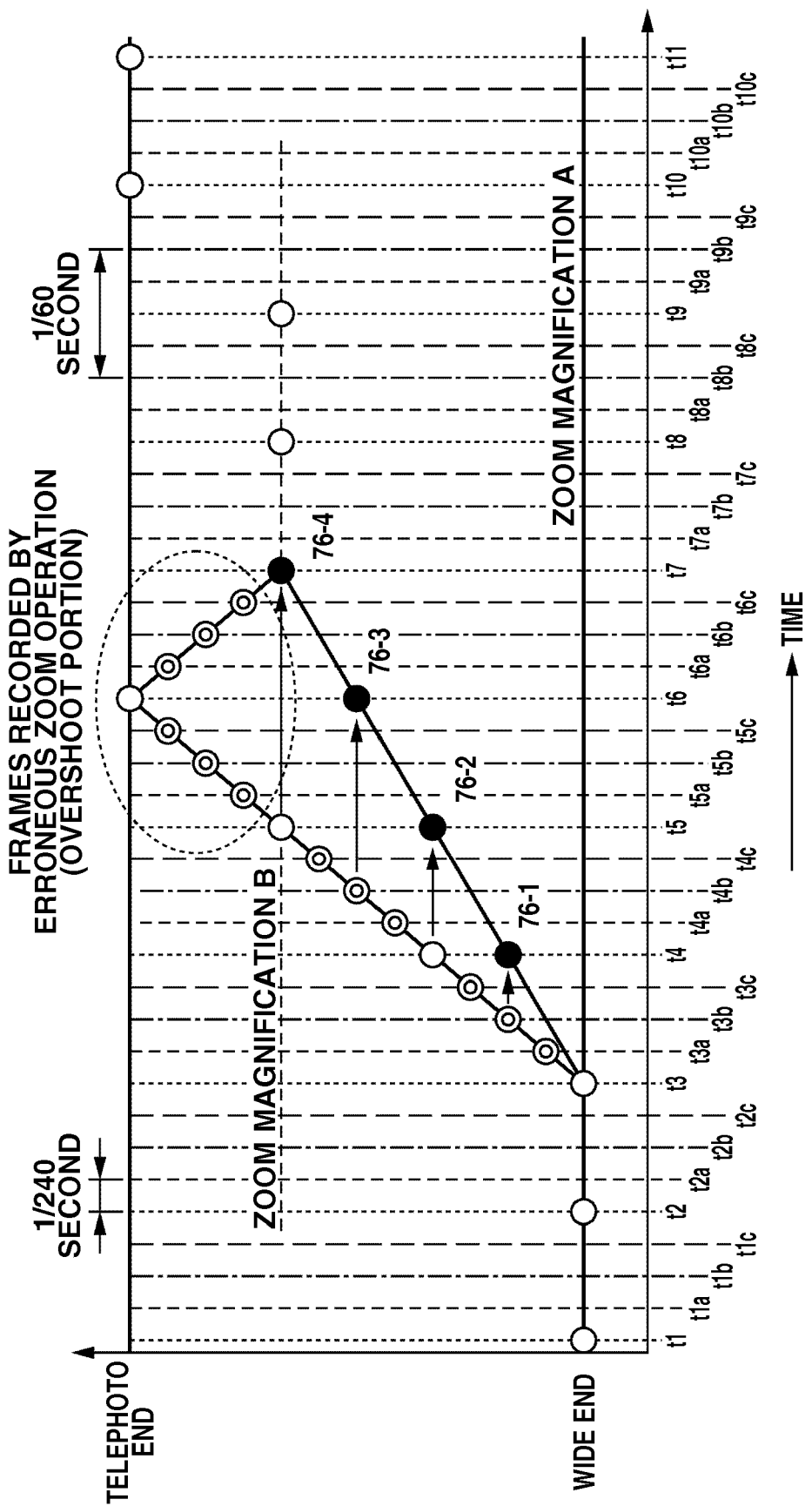

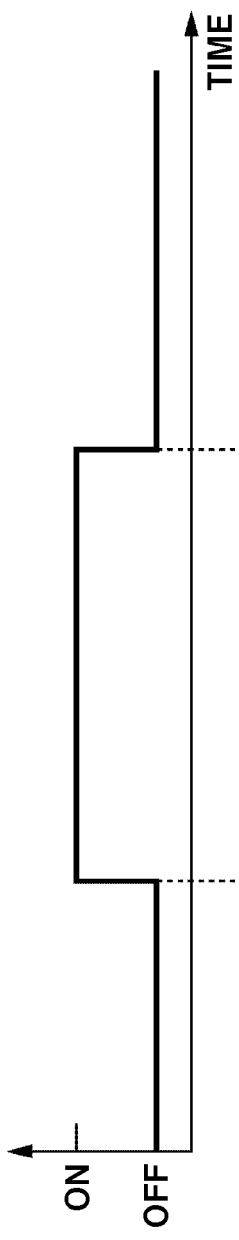
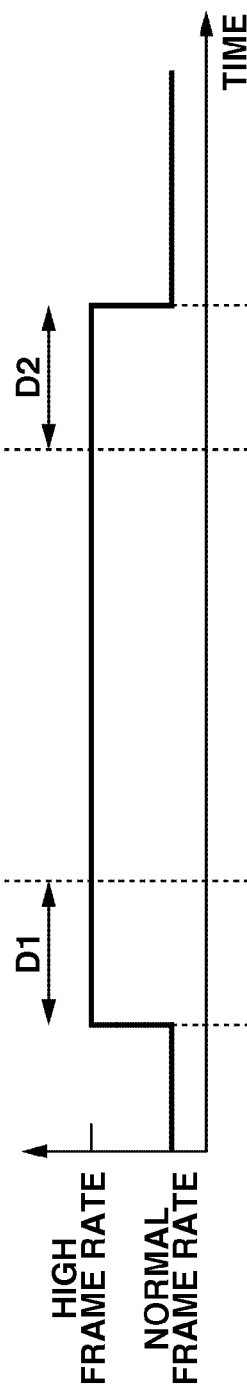
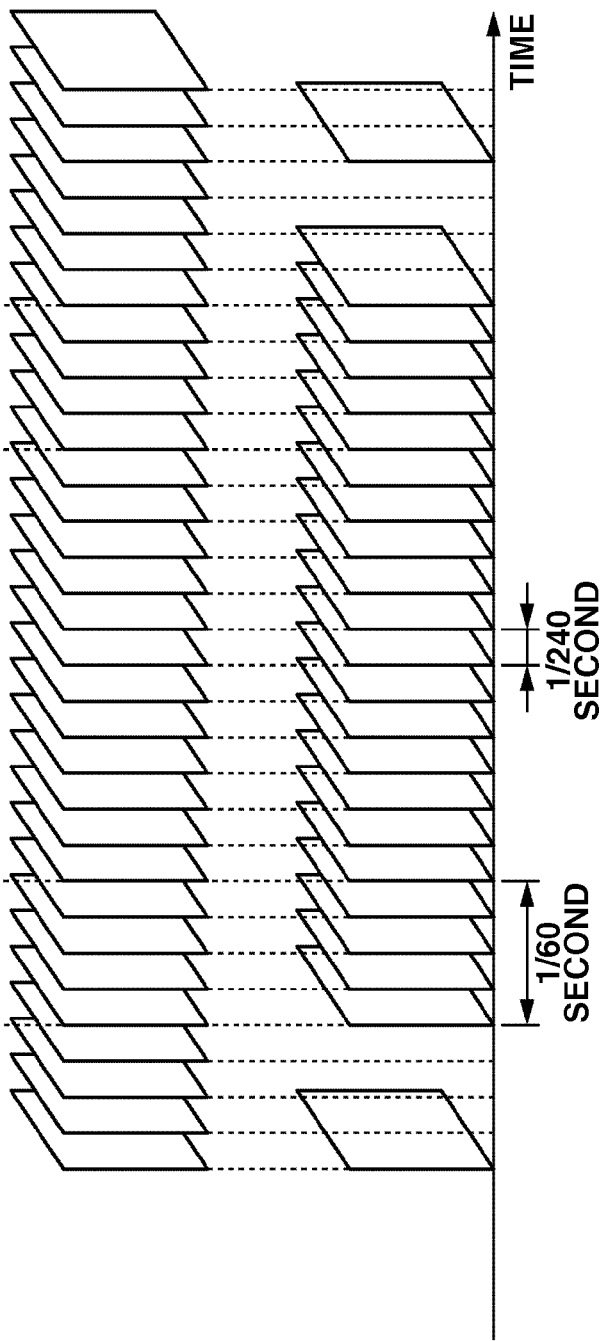
FIG. 15A ZOOM OPERATION
FIG. 15B FRAME RATE CONTROL SIGNAL
FIG. 15C CAPTURED FRAMES
FIG. 15D RECORDED FRAMES

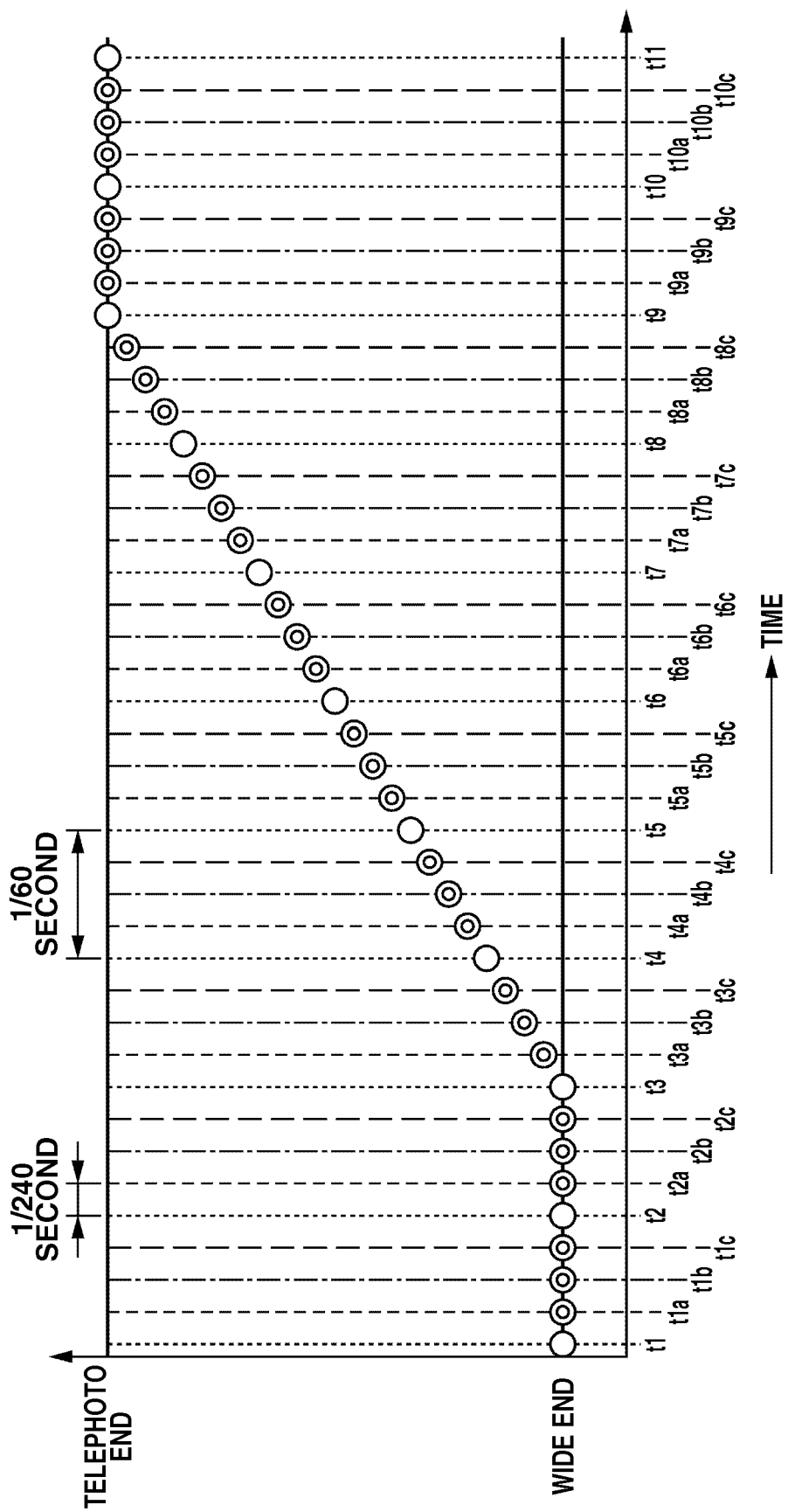

IMAGING APPARATUS AND REPRODUCING APPARATUS WHICH CHANGES FRAME RATE BASED ON ZOOM OPERATION

BACKGROUND OF THE INVENTION

1. Field of the Invention

The present invention relates to an imaging apparatus that records moving images, and to a reproducing apparatus that reproduces the moving images, such as a video camera or a digital camera.

2. Description of the Related Art

In recent years, a recording and reproducing apparatus capable of recording/reproducing high-quality video signals such as high definition (HD) video signals or HD signals, and a video display apparatus capable of displaying such signals as images have been widely spread. Background techniques of an image processing system used in these apparatuses include techniques of miniaturizing the size of an image sensor, increasing the number of pixels, increasing the speed of transfer processing, and improving the efficiency of coding such as the H.264 standard. In addition, various types of video display apparatuses have been made available, such as those of a liquid crystal type, a plasma type, and an electro-luminous (EL) type. Further, video display apparatuses having a further decreased thickness, a higher definition, and/or a larger screen are being developed. Mobile-type video display apparatuses are also being developed.

Since display apparatuses of such various types have been become available, users' viewing styles have changed significantly. Users handle images in various manners depending on the purpose, for example, some users prefer high-quality images while others wish to exchange short movies with ease.

Techniques for storing large amounts of video data play an important role in addressing the needs of users. Particularly, remarkable progress has been made in the increase of the capacity of hard disks and in the decrease of costs thereof, followed by semiconductor memories. Additionally, large-capacity removable media or servers on the order of terabytes have been made available at low cost.

Under the background described above, while the frame rate of the national television system committee (NTSC) is 29.97 frames/second in the field of imaging techniques, higher frame rates such as 120 frames/second and 240 frames/second are proposed. Further, techniques for multi-screen reproduction and reproduction with multi-audio channels are also being developed. Based on these techniques, more realistic and dynamic images can be displayed.

While video signals are conventionally recorded at a fixed frame rate, some techniques are proposed for appropriately changing the frame rate, efficiently suppressing the total amount of recording data, and recording high-quality videos when necessary.

Japanese Patent Application Laid-Open No. 2003-274360 (U.S. Pat. No. 7,456,875) discusses a technique for controlling the frame rate of captured video signals without requiring a photographer's control. More specifically, based on this technique, when an image is captured, a surrounding audio volume level is monitored, and if it is detected that the monitored volume level exceeds a predetermined level, the frame rate is increased, so that important scenes are recorded with high quality. Further, based on this technique, when the available memory capacity of a recording medium reaches less than or equal to a predetermined level, the frame rate is decreased to suppress consumption of the recording medium. In addition, when the available power of a battery reaches less than or equal to a predetermined level, the frame rate is decreased to suppress consumption of the battery.

Japanese Patent Application Laid-Open No. 2007-134991 (USPA 2007/0104462) discusses a technique in which motion of a captured image is detected. Based on this technique, when the detected motion is more than or equal to a threshold, the captured image is recorded at a high frame rate, and when the detected motion is less than the threshold, the captured image is recorded at a low frame rate.

However, based on the above techniques discussed in Japanese Patent Application Laid-Open No. 2003-274360 (U.S. Pat. No. 7,456,875) and Japanese Patent Application Laid-Open No. 2007-134991 (USPA 2007/0104462), change of the frame rate does not reflect photographer's intention. Namely, based on the technique discussed in Japanese Patent Application Laid-Open No. 2003-274360 (U.S. Pat. No. 7,456,875), the frame rate is changed depending on conditions surrounding an imaging apparatus, such as the surrounding audio volume level or the available power of a recording medium or a battery. Thus, the imaging condition is changed without photographer's intention.

In addition, the technique discussed in Japanese Patent Application Laid-Open No. 2007-134991 (USDA 2007/0104462) uses motion information acquired from an image signal as an index. For example, when the ratio of monotonous scenes including the sky or night scenes is increased, it is determined that the amount of motion is less, and as a result, the image is recorded at a low frame rate. On the other hand, in a wide image whose focal length is short, the motion amount tends to be detected as being large because of camera shake, and consequently, the image is recorded at a high frame rate. In either case, the frame rate is determined irrespective of photographer's intention.

Normally, TV receivers or video monitors support only a fixed frame rate. Thus, when a video signal is input and the frame rate thereof is changed in the middle of processing, even if the change of the frame rate can be followed, the video may be displayed at an unnatural rendering speed misaligned with the actual time. For example, if a monitor receives an input video signal and displays the signal at a certain rate images captured at a frame rate higher than the standard frame rate are rendered in slow motion, and images captured at a lower frame rate are rendered at high speed.

Since compatibility between these viewing and reproduction environments is not taken into consideration, use of the technique of variable frame rate recording is limited.

SUMMARY OF THE INVENTION

The present invention is directed to an imaging apparatus capable of changing a frame rate in view of a photographer's intention and maintaining compatibility with existing viewing and reproduction environments.

According to an aspect of the present invention, an imaging apparatus includes an imaging unit including an image sensor configured to convert an optical image to an image signal, and a zoom unit configured to optically zoom an optical image incident on the image sensor or electronically zoom an image signal output from the image sensor, a recording unit configured to record a video signal including an image signal captured by the imaging unit in a recording medium, and configured to record a recording frame rate, at which the video signal is recorded in the recording medium, and zoom operation information for the zoom unit in the recording medium, a zoom operation unit configured to operate the zoom unit, a control unit configured to control the recording frame rate at which the video signal is recorded in the recording medium based on an operation of the zoom operation unit, and configured to increase the recording frame rate to be higher than a normal frame rate during a period including a period when the zoom operation unit is operated, and a reproducing unit configured to reproduce the video signal from the recording medium based on a set reproduction mode, and configured to carry out thinning processing on the video signal during the period including the period when the zoom operation unit is operated based on the zoom operation information and reproduce the processed video signal at the normal frame rate.

Based on an imaging apparatus and a reproducing apparatus according to the present invention, videos including zoom operations can be reproduced. Since videos are reproduced at a standard frame rate, compatibility with existing video display apparatuses can be ensured. During periods including zoom operation periods, videos are recorded at a frame rate higher than a normal frame rate, and when the videos are reproduced, the frame rate is reduced to the standard frame rate. Thus, high-quality reproduction videos can be displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a table illustrating reproduction modes that involve zoom operations.

FIG. 10 illustrates frame interpolation in reproduction mode 1 of the exemplary embodiment.

FIG. 11 illustrates frame interpolation in reproduction mode 2 of the exemplary embodiment.

FIG. 12 illustrates frame interpolation in reproduction mode 3 of the exemplary embodiment.

FIG. 13 illustrates frame interpolation in reproduction mode 5 of the exemplary embodiment.

FIGS. 15A to 15D illustrate a relationship among a zoom operation, captured frames, and recorded frames of a second exemplary embodiment.

FIG. 16 illustrates a relationship between zoom magnification and recorded frames of the second exemplary embodiment.

DESCRIPTION OF THE EMBODIMENTS

Various exemplary embodiments, features, and aspects of the invention will be described in detail below with reference to the drawings.

Figure 1:
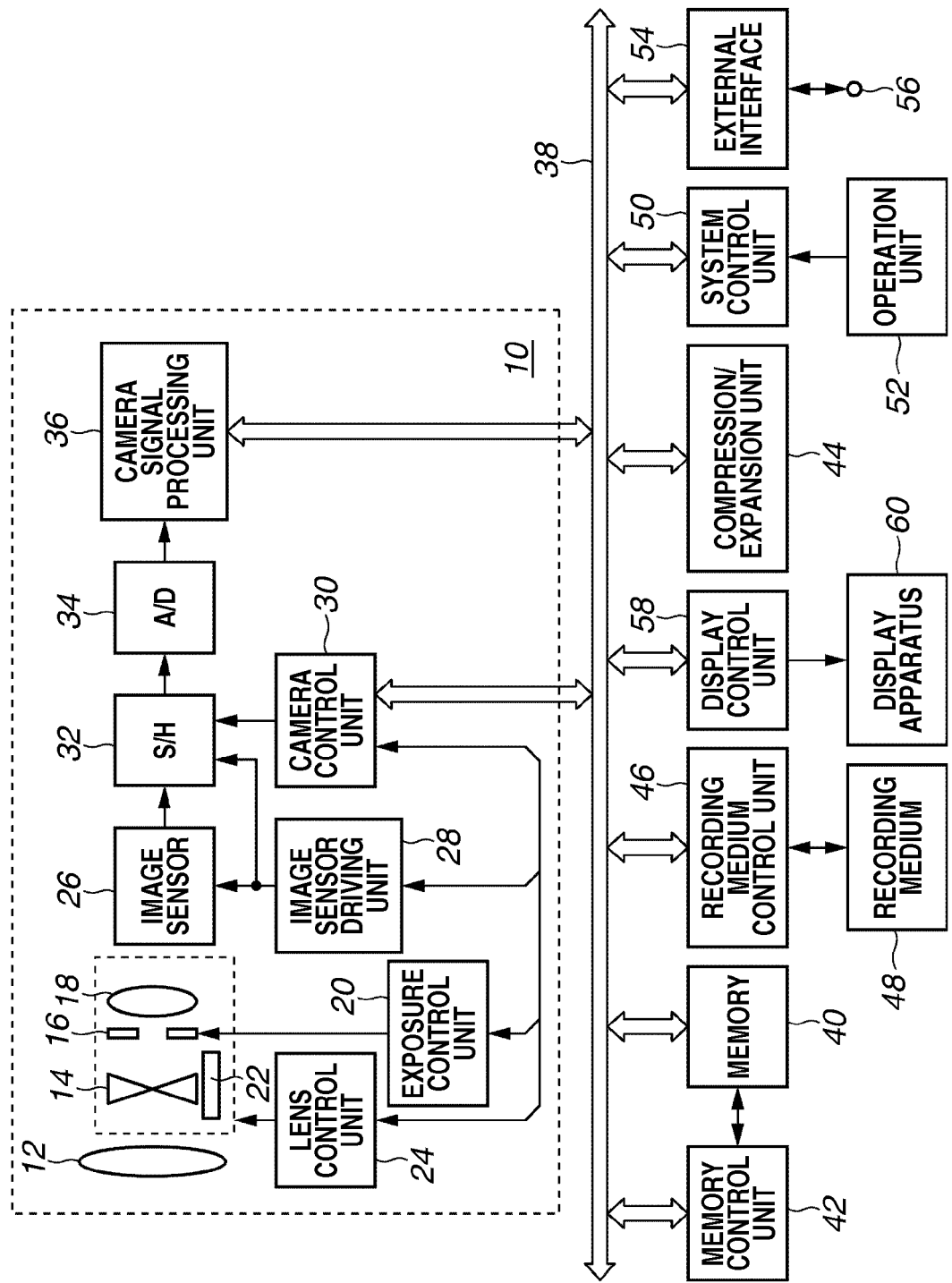
FIG. 1 is a block diagram illustrating a schematic configuration of an exemplary embodiment of the present invention.

FIG. 1 is a block diagram illustrating a schematic configuration of an exemplary embodiment of the present invention. A configuration and a basic operation of the present exemplary embodiment will be described with reference to FIG. 1.

An imaging unit 10 (camera unit) has the following configuration and functions. The imaging optical system of the imaging unit 10 includes a front lens 12, a zoom lens 14, a diaphragm 16, and a focus lens 18. The front lens 12 is fixed to a lens barrel, and the zoom lens 14 and the focus lens 18 can move along the optical axis. The diaphragm 16 is arranged between the zoom lens 14 and the focus lens 18.

An exposure control unit 20 receives a control signal from a camera control unit 30 and controls the aperture of the diaphragm 16 based on the control signal. A zoom position sensor 22 detects the position of the zoom lens 14. Based on the position of the zoom lens 14 detected by the zoom position sensor 22, a lens control unit 24 carries out feedback control on the zoom lens 14. The lens control unit 24 also controls the zoom position of the zoom lens 14 and the focus position of the focus lens 18, based on instruction signals from the camera control unit 30 to be described later.

An image sensor driving unit 28 drives an image sensor 26 that converts an optical image formed by the imaging optical system into an electric image signal. The image sensor driving unit 28 drives the image sensor 26 based on a timing signal supplied from the camera control unit 30 and controls the image sensor 26 to output each pixel signal for the image signal. By increasing the driving signal frequency of the image sensor driving unit 28, a frame rate higher than a standard frame rate can be handled.

A sample-and-hold (S/H) unit 32 amplifies the image signal output from the image sensor 26, and samples and holds the signal based on a timing signal supplied from the camera control unit 30 (or the image sensor driving unit 28). An analog-to-digital (A/D) converter 34 converts the signal supplied from the S/H unit 32 into a digital signal, and supplies the digital signal to a camera signal processing unit 36.

Based on parameters set by the camera control unit 30, the camera signal processing unit 36 carries out known camera signal processing, such as color separation, gradation correction, and white balance adjustment, on the image data output from the A/D converter 34. The camera signal processing unit 36 supplies the processed image data to a compression/expansion unit 44 via a data bus 38 and a memory 40.

While an audio input unit and a system for processing an audio signal supplied from the audio input unit are not illustrated in FIG. 1, input audio data is supplied to the compression/expansion unit 44 via the memory 40. The compression/expansion unit 44 carries out compressing, coding, and multiplexing processing on the input image and audio data, based on a moving image compression method such as moving picture experts group (MPEG) 2 or H.264. The compression/expansion unit 44 outputs the data in a predetermined format.

A recording medium control unit 46 writes the image and audio data compressed by the compression/expansion unit 44 in a recording medium 48. Examples of the recording medium 48 include a nonvolatile semiconductor memory such as a flash memory, a hard disk apparatus, and a recordable optical disk.

Based on instructions from the system control unit 50, the camera control unit 30 controls operations of the lens control unit 24, the exposure control unit 20, the image sensor driving unit 28, and the camera signal processing unit 36.

The system control unit 50 includes a central processing unit (CPU) and controls individual units according to instructions from an operation unit 52 operated by a user, setting values, or an operation status. For example, the system control unit 50 controls an imaging operation via the camera control unit 30 and controls recording/reproducing data in the recording medium 48 via the recording medium control unit 46. Needless to say, the system control unit 50 comprehensively controls the entire imaging apparatus by executing predetermined programs.

An external interface (I/F) 54 sends and receives signals in a predetermined format to and from an external device connected to an external terminal 56. Examples of the external terminal 56 include terminals that comply with standards such as the institute of electrical and electronic engineers (IEEE) 1394, universal serial bus (USB) and/or the high-definition multimedia interface (HDMI). Examples of the signal format include analog video signals (audio/video) and digital video signals of various resolutions and frame rates.

The operation unit 52 is used as a user interface and includes a shutter button, a zoom button, a power-source on/off button, and a record start/stop button used during imaging or recording. The operation unit 52 also includes a select button, a determination button, and a cancel button used to make selection on the menu, set parameters, and the like.

A display control unit 58 drives a display apparatus 60, which is used as a monitor displaying captured images and reproduced images and is used as a display unit displaying various types of management information to users.

The memory 40 is shared by each function block via the data bus 38, and is formed by a read only memory (ROM) and/or a random-access memory (RAM). Each function block connected to the data bus 38 can write and read data in and from the memory 40 via a memory control unit 42.

Image and audio data recorded in the recording medium 48 is reproduced as follows. The recording medium control unit 46 supplies compressed data read from the recording medium 48 to the compression/expansion unit 44. The compression/expansion unit 44 decompresses the input compressed data to restore video data and audio data.

The display control unit 58 supplies the restored video data to the display apparatus 60, which displays a reproduced image using the supplied video data. Examples of the display apparatus 60 include a liquid crystal display panel and an organic light-emitting device. A speaker (not illustrated) outputs reproduced audio. When necessary, reproduced video data and audio data is output to the outside via the external I/F 54 and the external terminal 56.

Figure 2:
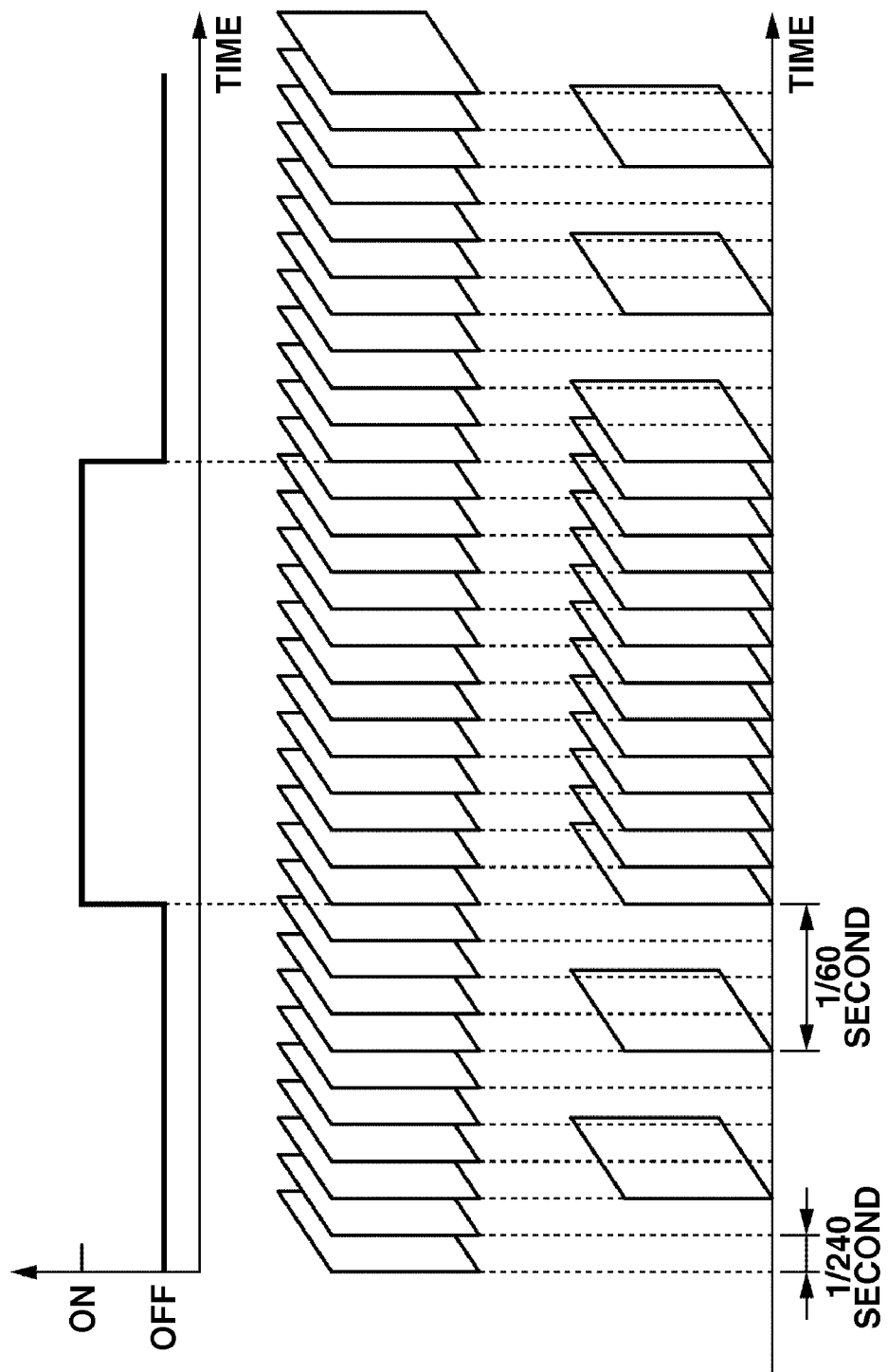
FIGS. 2A to 2C illustrate a relationship among a zoom operation, captured frames, and recorded frames of the exemplary embodiment.

An operation for controlling the frame rate at which video data is recorded in the recording medium 48 will be described below. FIG. 2 illustrates a relationship between captured frames temporarily stored in the memory 40 and recorded frames recorded in the recording medium 48. FIG. 2A illustrates a zoom operation period during imaging carried out by the operation unit 52. FIG. 2B illustrates captured frames temporarily stored in the memory 40. FIG. 2C illustrates recorded frames recorded in the recording medium 48.

FIG. 2A illustrates a zoom-on period, which is when a zoom operation is carried out by a photographer, and a zoom-off period, which is when no zoom operation is carried out by a photographer. As illustrated in FIG. 2B, the camera control unit 30 drives the image sensor 26 at a rate of 1/240 second, irrespective of on/off of the zoom operation. The image data of each frame is temporarily stored in the memory 40 at a frame rate of 1/240 second.

The camera control unit 30 controls the recording medium control unit 46 to write frame images temporarily stored in the memory 40 in the recording medium 48, as illustrated in FIG. 2C. More specifically, the number of the frame images captured during the zoom-off period and temporarily stored in the memory 40 is thinned to 1/4, and the resultant frame images are written in the recording medium 48 at a normal frame rate of 1/60 second. In the zoom-on period, the frame images temporarily stored in the memory 40 at a frame rate of 1/240 second are written in the recording medium 48 without change.

Figure 3:
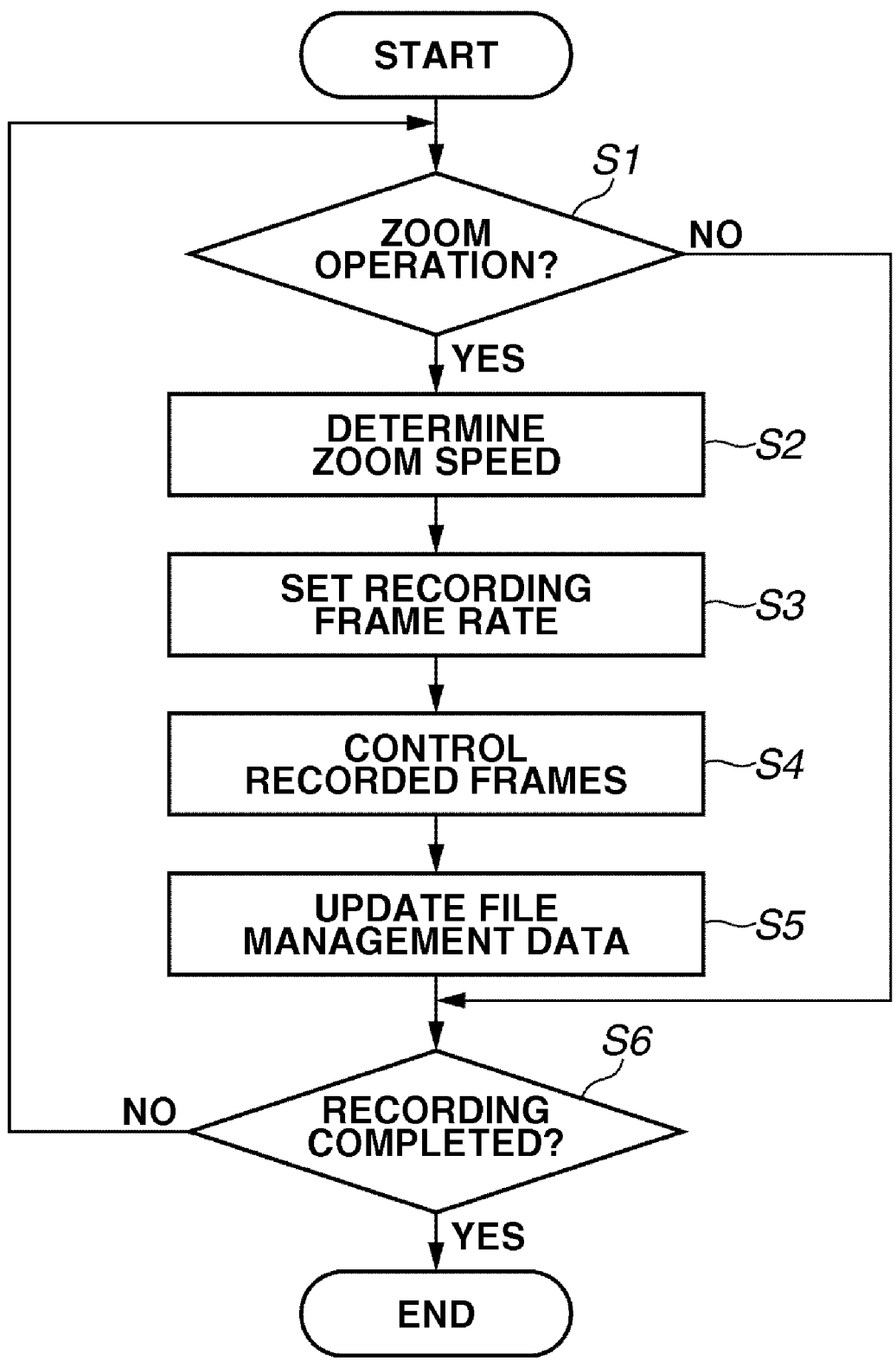
FIG. 3 is a flow chart illustrating a recording operation of the exemplary embodiment.

FIG. 3 is a flow chart illustrating a control operation of a recording frame rate. The system control unit 50 monitors a zoom operation carried out by the operation unit 52. In step S1, if the system control unit 50 detects a zoom operation during a recording operation (YES in step S1), the system control unit 50 carries out the processing in steps S2 to S5. If not (NO in step S1), the processing proceeds to step S6.

If the system control unit 50 detects a zoom operation (YES in step S1), in step S2, the system control unit 50 determines the zoom speed. For example, the zoom speed is determined based on the force applied by the user to the zoom switch on the operation unit 52 or the length of time while the zoom switch is pushed. If a zoom speed is previously or initially set on the menu screen or the like, the system control unit 50 refers to the zoom speed. In other words, the system control unit 50 also functions as a zoom speed detection unit.

Figure 4:
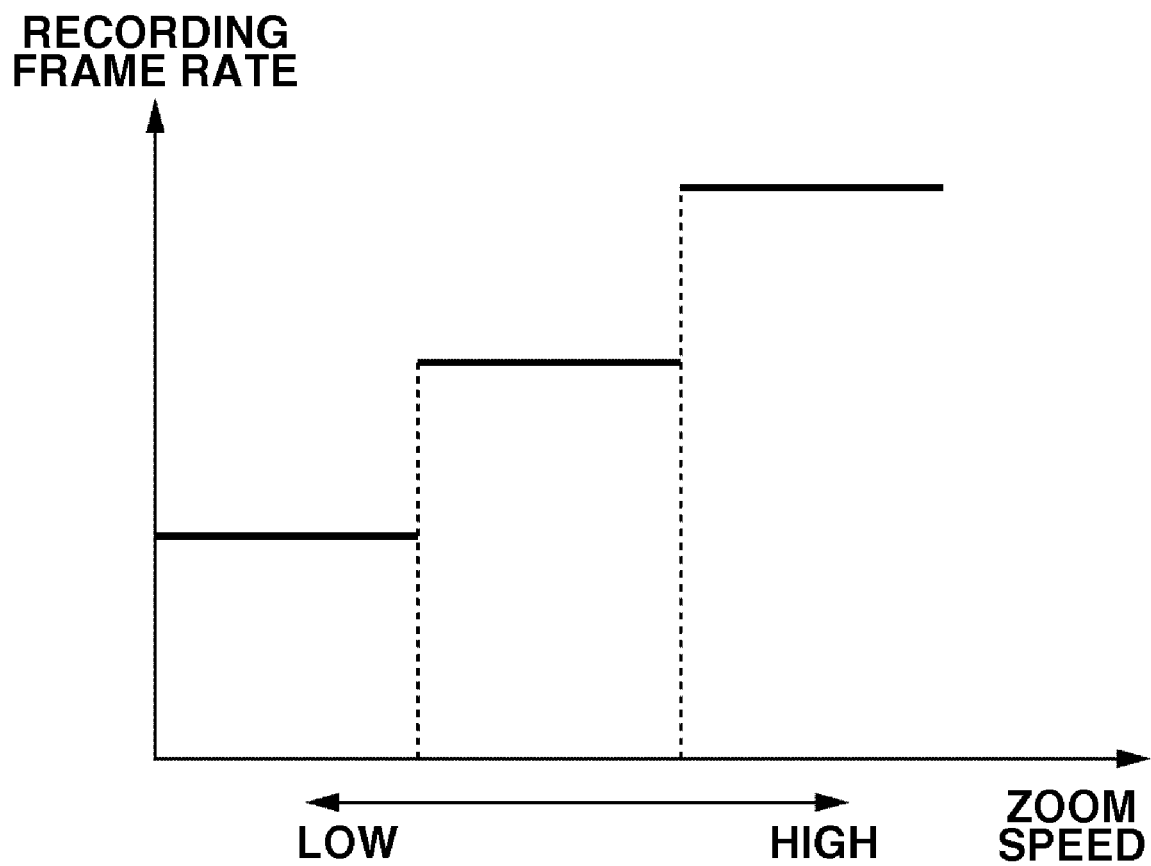
FIG. 4 illustrates a relationship between a zoom speed and a recording frame rate of the exemplary embodiment.

In step S3, based on the zoom speed determined in step S2, the system control unit 50 sets a recording frame rate. FIG. 4 illustrates a relationship between the recording frame rate and the zoom speed. As illustrated in FIG. 4, a higher recording frame rate is set for a higher zoom speed, and a lower recording frame rate is set for a lower zoom speed.

As the relationship between the zoom speed and the recording frame rate of FIG. 4 illustrates, the recording frame rate may be changed on a step-by-step basis depending on the zoom speed. Alternatively, the recording frame rate may be changed linearly. Such a relationship between the zoom speed and the recording frame rate is previously set in a form of a table and stored in the memory 40 (ROM therein).

In step S4, the system control unit 50 carries out a thinning process on the image frame data in the memory 40 based on the recording frame rate set in step S3, and records the remaining frames in the recording medium 48. In step S5, the system control unit 50 records zoom magnification information and frame rate management information in the recording medium 48 as metadata, along with video data of each frame. In step S6, if instructions to stop recording are input, the processing ends. If not, steps S1 to S5 are repeated.

Since the recording frame rate is changed based on the zoom speed, when images are captured at a low zoom speed, the images are recorded at a low frame rate. Thus, since unnecessary captured frames are not recorded, consumption of the available capacity of the recording medium 48 can be suppressed. While an object moves rapidly during a zoom-on period at a high zoom speed, since the object is followed at a high frame rate, captured scenes in which the angle of view changes greatly can be recorded with good quality at a high sampling rate.

Figure 5:
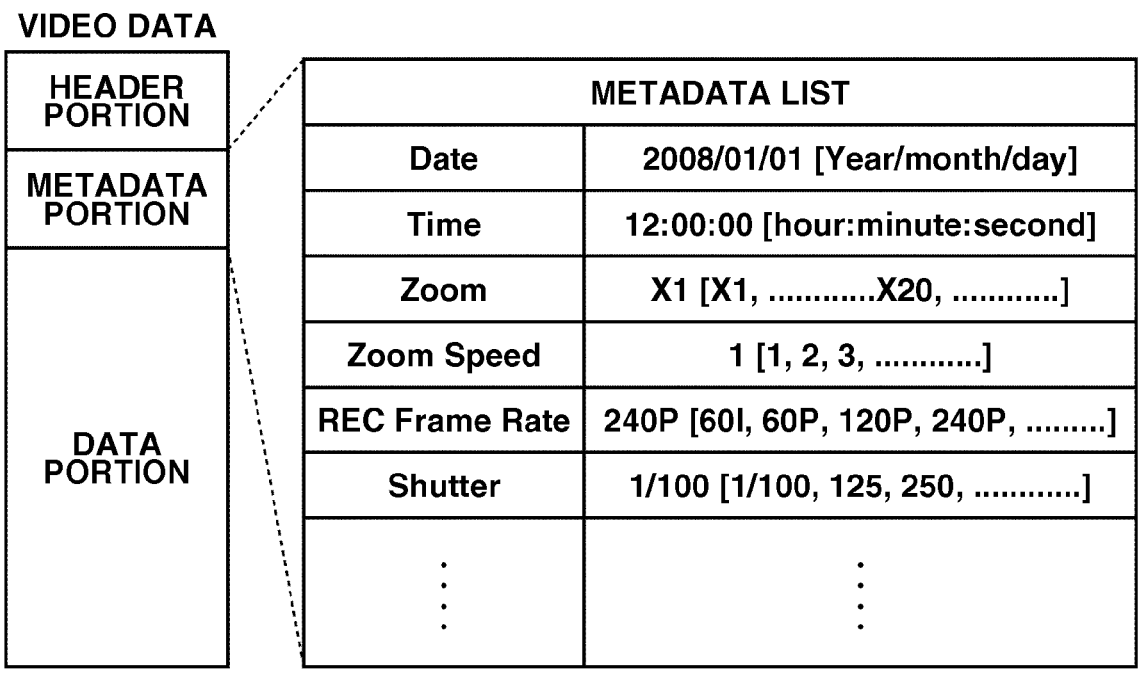
FIG. 5 illustrates a metadata structure and data examples of the present exemplary embodiment.

FIG. 5 illustrates a structure of metadata added to the video data of each frame, and data examples. The video data includes a header portion, a metadata portion, and a data portion. The header portion stores basic information that does not change depending on time, such as imaging apparatus information, format information, and thumbnail information.

The metadata portion stores information that is updated depending on various imaging conditions, such as a date, time, a recording frame rate, and a shutter speed. The data portion stores image data and audio data encoded in a predetermined format. The metadata is embedded in the video data in the metadata format using a description language such as extensible markup language (XML) or hypertext markup language (HTML). The metadata may be added as binary data or a watermark.

Figure 6:
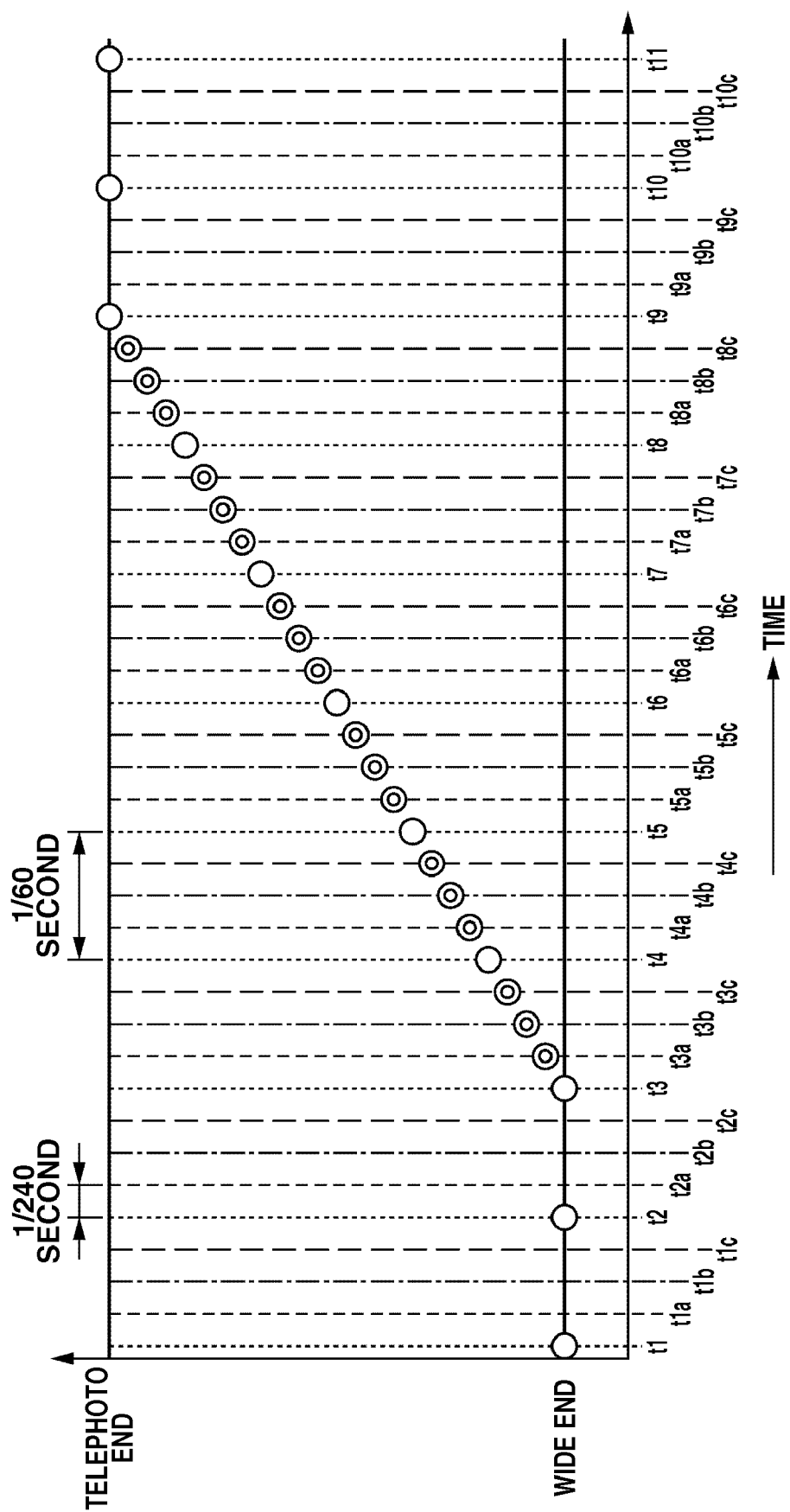
FIG. 6 illustrates a relationship between zoom magnification and recorded frames of the exemplary embodiment.

FIG. 6 schematically illustrates a relationship between the recording frame rate and the zoom magnification according to the present exemplary embodiment. In FIG. 6, the horizontal axis represents time, and the vertical axis represents zoom magnification (angle of view of the image). Double circles represent frames captured at $1/240$-second intervals, and single circles represent frames captured at $1/60$-second intervals. According to the present exemplary embodiment, the frames represented by the single circles and captured at $1/60$-second intervals are recorded in the recording medium 48, irrespective of on/off of the zoom operation.

In the example illustrated in FIG. 6, during the zoom operation, namely, during the period between time t3 and time t9 when the zoom magnification changes, frames captured at $1/240$-second intervals, which is a rate higher than normal rate, are recorded in the recording medium 48. Namely, captured frames are recorded at $1/240$-second intervals during the zoom operation, and when the zoom operation is not carried out, the captured frames are thinned and recorded at $1/60$-second intervals.

Figure 7:
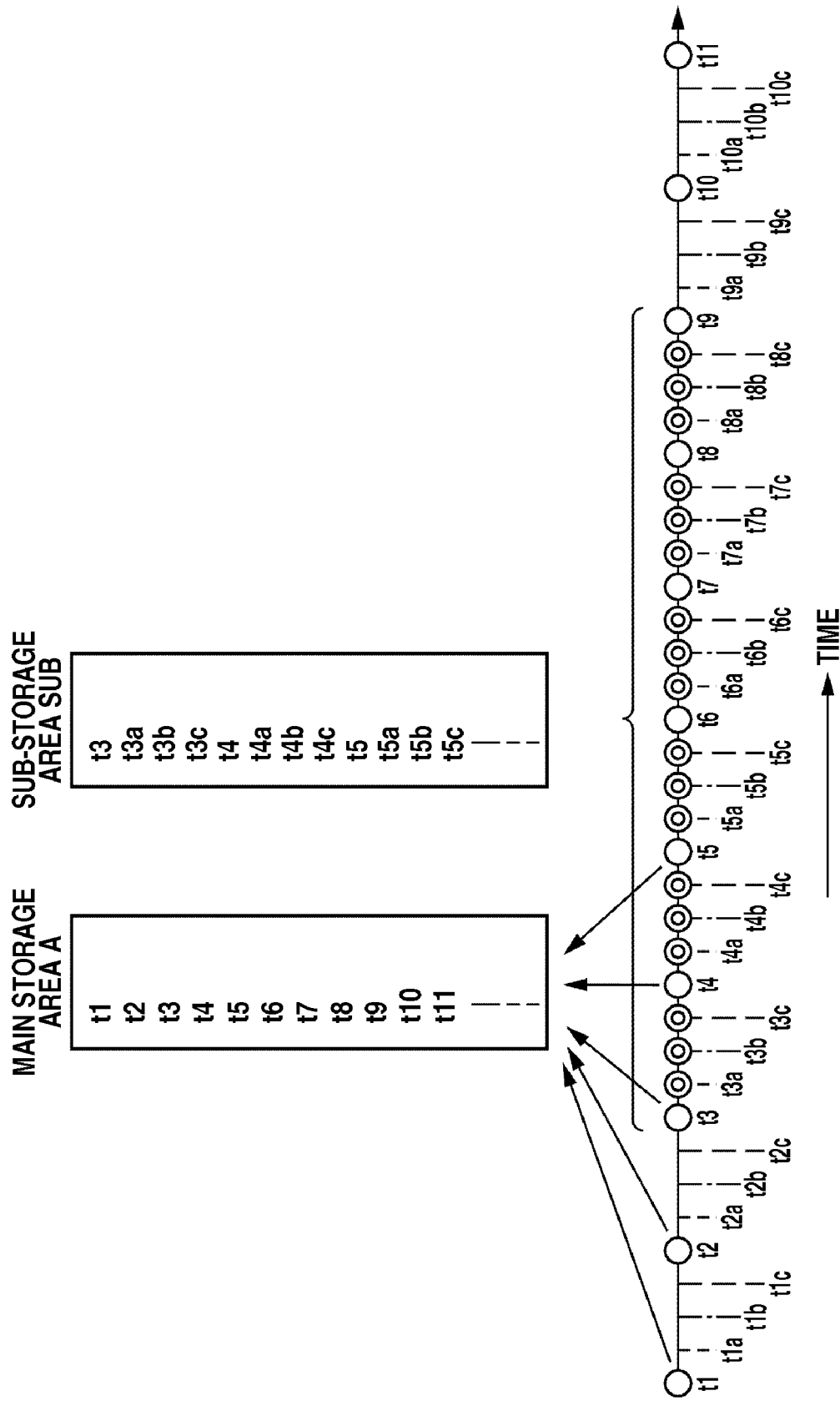
FIG. 7 illustrates recording areas each storing frames at different frame rates.

To ensure compatibility for reproduction, according to the present exemplary embodiment, storage of the video data in the recording medium 48 is controlled as follows. FIG. 7 illustrates an example of how image data illustrated in FIG. 6 is allocated and recorded in the recording medium 48.

Frames captured at t1, t2, t3, and the like at a normal recording frame rate of $1/60$ second are stored in a main storage area A of the recording medium 48. On the other hand, if a zoom operation is carried out and the frame rate is changed, the frames captured at a higher frame rate between t3, t3a, t3b, t3c, t4, ..., and t9 are stored in a sub-storage area Sub of the recording medium 48.

Thus, by separating video data depending on the frame rate and separately storing the data in different areas of the recording medium 48, even when an apparatus without special reproduction functions is used, the video data stored in the main storage area A can be reproduced. Thus, compatibility for reproduction can be ensured. The main storage area A and the sub-storage area Sub are distinguished logically in terms of file management, and thus physical recording locations of these areas may be identical.

In FIG. 7, the frames captured at t3, t4, t5, and the like are recorded in the sub-storage area Sub as well as in the main storage area A. This is for decryption processing carried out during reproduction. If the frames captured at t3, t4, t5, and the like in the main storage area can be used, these frames do not need to be stored in the sub-storage area Sub.

Figure 8:
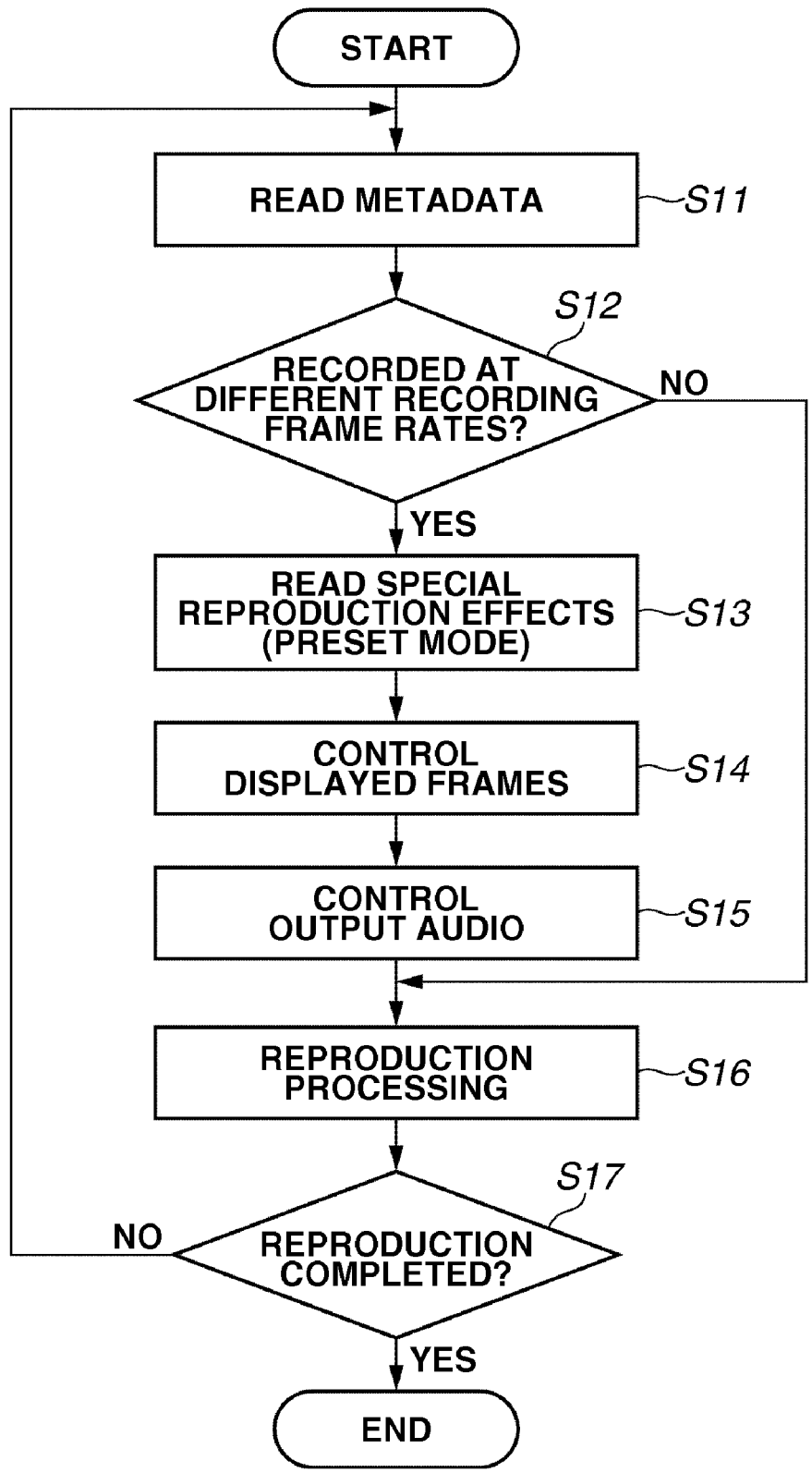
FIG. 8 is a flow chart illustrating a reproduction operation of the exemplary embodiment.

A reproduction operation of the present exemplary embodiment will be described below. According to the present exemplary embodiment, before reproducing videos of different frame rates, an interpolation or thinning process is carried out. In this way, scenes captured during a zoom operation can be provided with special reproduction effects. FIG. 8 is a flow chart illustrating a reproduction operation.

In step S11, based on reproduction instructions from the operation unit 52, the system control unit 50 reads metadata about a specified video file from the file management information of the recording medium 48. In step S12, the system control unit 50 refers to the metadata and determines whether videos of different frame rates are recorded in the video file to be reproduced.

If images are not recorded at different recording frame rates (NO in step S12), the processing proceeds to step S16. In step S16, normal reproduction processing is carried out.

If images are recorded at different recording frame rates (YES in step S12), in step S13, the system control unit 50 reads special reproduction effects previously set by the user. In steps S14 and S15, the system control unit 50 controls displayed frames and voice output as described below. FIG. 9 is a table illustrating special reproduction effects (modes) that involve zoom operations and the effects of the individual modes.

A linear smoothing mode (mode 1) is a reproduction interpolation mode in which, even when the speed of a zoom operation carried out by the user is not constant, the zoom speed is changed during reproduction processing and reproduced images are displayed (rendered) at a constant zoom speed. In the linear smoothing mode, among the frames recorded in the recording medium 48, the system control unit 50 selects frames so that the zoom magnification of the selected frames changes proportionally. Next, the selected frames are displayed on the display apparatus 60 at a normal frame rate.

FIG. 10 schematically illustrates frames displayed in the linear smoothing mode. The horizontal axis represents time and the vertical axis represents zoom magnification (angle of view of the image). Double circles represent frames recorded at $1/240$-second intervals during a zoom operation, and single circles represent frames recorded at $1/60$-second intervals. During the period between time t3 and time t9 when the zoom magnification is changing, captured frames are recorded at $1/240$-second intervals.

When the zoom operation is not carried out, the captured frames are thinned and recorded at a frame rate of $1/60$-second intervals. As illustrated in FIG. 10, the zoom speed is not constant during imaging, i.e., the zoom speed fluctuates during a zoom operation from the wide end to the telephoto end.

The linear smoothing mode will be described in detail with reference to FIG. 10. Actually recorded frames are shifted so that the zoom magnification linearly changes as set in the linear smoothing mode, and the frames used to be reproduced and displayed at a normal frame rate are selected and determined. In FIG. 10, the frames at time t5c, t6c, t7c, t8a, and t8c are selected to be displayed.

The frame at time t5c is shifted as a frame at time t4 (frame 70-1 represented as a black circle) to be displayed. The frame at time t6c is shifted as a frame at time t5 (frame 70-2 represented as a black circle) to be displayed. The frame at time t7c is shifted as a frame at time t6 (frame 70-3 represented as a black circle) to be displayed. The frame at time t8a is shifted as a frame at time t7 (frame 70-4 represented as a black circle) to be displayed. The frame at time t8c is shifted as a frame at time t8 (frame 70-5 represented as a black circle) to be displayed.

Thus, in the linear smoothing mode, captured frames (recorded frames) whose zoom magnification changes linearly from the wide end to the telephoto end are re-arranged on the time axis so that the frames are displayed at a constant zoom speed.

A dynamic shooting mode (mode 2) is a reproduction interpolation mode in which an image is zoomed rapidly as the object comes closer, irrespective of the zoom operation speed by the user. In other words, the linear smoothing mode provides a zoom effect of gradually increasing the zoom speed.

Among the recorded frames in the recording medium 48, the system control unit 50 selects frames so that the speed, at which the zoom magnification changes, is gradually increased. The selected frames are displayed on the display apparatus 60 at a normal frame rate.

FIG. 11 schematically illustrates frames displayed in the dynamic shooting mode. The horizontal axis represents time and the vertical axis represents zoom magnification (angle of view of the image). Double circles represent frames recorded at $1/240$-second intervals during a zoom operation, and single circles represent frames recorded at $1/60$-second intervals.

During the period between time t3 and time t9 when the zoom magnification changes, captured frames are recorded at $1/240$-second intervals. When the zoom operation is not carried out, the captured frames are thinned and recorded at a frame rate of $1/60$-second intervals. In the example illustrated in FIG. 11, the speed, at which the zoom magnification changes, is constant during imaging.

The dynamic shooting mode will be described in detail with reference to FIG. 11. Actually recorded frames are shifted so that the zoom magnification is changing in a curve as set in the linear smoothing mode, and the frames used to be reproduced and displayed at a normal frame rate are selected and determined. In FIG. 11, the frames at time t3, t3a, t3b, t4, and t5a are selected to be displayed.

The frame at time t3 is temporally shifted as a frame at time t4 (frame 72-1 represented as a black circle) to be displayed. The frame at time t3a is temporally shifted as a frame at time t5 (frame 72-2 represented as a black circle) to be displayed. The frame at time t3b is temporally shifted as a frame at time t6 (frame 72-3 represented as a black circle) to be displayed. The frame at time t4 is temporally shifted as a frame at time t7 (frame 72-4 represented as a black circle) to be displayed. The frame at time t5a is temporally shifted as a frame at time t8 (frame 72-5 represented as a black circle) to be displayed.

Thus, in the dynamic shooting mode, frames whose zoom magnification changes nonlinearly from the wide end to the telephoto end are displayed at a normal frame rate, so that the zoom speed is gradually increased.

A soft landing mode (mode 3) is a reproduction interpolation mode in which an image is zoomed in a decreasing speed as the object comes closer, irrespective of the zoom operation speed by the user. Namely, the soft landing mode provides a zoom effect of gradually decreasing the zoom speed.

Among the recorded frames in the recording medium 48, the system control unit 50 selects frames so that the zoom speed gradually decreases as the object comes closer. The selected frames are displayed on the display apparatus 60 at a normal frame rate.

FIG. 12 schematically illustrates frames displayed in the soft landing mode. The horizontal axis represents time and the vertical axis represents zoom magnification (angle of view of the image). Double circles represent frames recorded at $1/240$-second intervals during a zoom operation, and single circles represent frames recorded at $1/60$-second intervals.

During the period between time t3 and time t9 when the zoom magnification changes, captured frames are recorded at $1/240$-second intervals. When the zoom operation is not carried out, the captured frames are thinned and recorded at a frame rate of $1/60$-second intervals. In the example illustrated in FIG. 12, the speed, at which the zoom magnification is changing, is constant during imaging.

The soft landing mode will be described in detail with reference to FIG. 12. Actually recorded frames are shifted so that the zoom magnification changes in a curve as set in the soft landing mode, and the frames used to be reproduced and displayed at a normal frame rate are selected and determined. In FIG. 12, the frames at time t6c, t8, t8b, t8c, and t9 are selected to be displayed.

The frame at time t6c is temporally shifted as a frame at time t4 (frame 74-1 represented as a black circle) to be displayed. The frame at time t8 is temporally shifted as a frame at time t5 (frame 74-2 represented as a black circle) to be displayed. The frame at time t8b is temporally shifted as a frame at time t6 (frame 74-3 represented as a black circle) to be displayed. The frame at time t8c is temporally shifted as a frame at time t7 (frame 74-4 represented as a black circle) to be displayed. The frame at time t9 is temporally shifted as a frame at time t8 (frame 74-5 represented as a black circle) to be displayed.

Thus, in the soft landing mode, frames whose zoom magnification changes nonlinearly from the wide end to the telephoto end are interpolated and displayed, so that the zoom speed is gradually decreased.

A slow motion mode (mode 4) is a reproduction mode in which all the frame images recorded at a high frame rate during a zoom operation are rendered at a preset magnification. For example, frame images captured and recorded at a high frame rate of $1/240$-second intervals during a zoom period are reproduced at a normal frame rate of $1/60$-second intervals. As a result, the images are displayed at a slow speed ($1/4$ of the original speed). Namely, the video recorded during a zoom operation is reproduced slowly and can be observed easily.

A skip mode (mode 5) is a reproduction mode that may be used when a user makes a mistake in a zoom operation. For example, when a user increases the zoom magnification excessively and decreases hurriedly, such erroneous operation is automatically detected, and reproduction of the images captured by the erroneous operation is skipped. When a zoom-in operation or a zoom-out operation is repeated in a short period of time and an erroneous operation is made, this mode is effective in removing the images captured by the erroneous operation.

FIG. 13 schematically illustrates frames displayed in the skip mode. The horizontal axis represents time and the vertical axis represents zoom magnification (angle of view of the image). Double circles represent frames recorded at $1/240$-second intervals during a zoom operation, and single circles represent frames recorded at $1/60$-second intervals.

During the period between time t3 and time t9 when the zoom magnification is changing, captured frames are recorded at $1/240$-second intervals. When the zoom operation is not carried out, the captured frames are thinned and recorded at a frame rate of $1/60$-second intervals. In the example illustrated in FIG. 13, the zoom magnification changes at a constant speed from the wide end at time t3 to the telephoto end at t6. However, after time t6, the zoom magnification is somewhat decreased toward the wide end. In FIG. 13, the frames captured during the erroneous operation are not displayed on the screen.

The skip mode will be described in detail with reference to FIG. 13. In the skip mode, changes in an intermediate area in the zoom magnification are ignored, and the skip mode sets such changes in the zoom magnification as illustrated in FIG. 13. More specifically, the starting point and the end point of a zoom operation are connected based on a certain rule (a straight line in FIG. 13). Next, actually recorded frames are shifted to correspond to the zoom magnification set in the skip mode, and the frames used to be reproduced and displayed at a normal frame rate are selected and determined.

In FIG. 13, the frames at time t3b, t4, t4b, and t5 are selected to be displayed. The frame at time t3b is temporally shifted as a frame at time t4 (frame 76-1 represented as a black circle) to be displayed. The frame at time t4 is temporally shifted as a frame at time t5 (frame 76-2 represented as a black circle) to be displayed. The frame at time t4b is temporally shifted as a frame at time t6 (frame 76-3 represented as a black circle) to be displayed. The frame at time t5 is temporally shifted as a frame at time t7 (frame 76-4 represented as a black circle) to be displayed.

Thus, when a user carries out an erroneous zoom operation or adjustment, if the user captures a video in which the zoom magnification is overshot, the user can reproduce and display the video without the overshoot portion by using the skip mode.

In the case of the example illustrated in FIG. 13, by monitoring the amount of the zoom operation within a certain time based on the metadata and determining an average zoom magnification A or B during a certain period, the zoom operation period that deviates from the average zoom magnification (overshoot portion) can be removed. Further, frame interpolation during a zoom operation is carried out by re-arranging the frames during the zoom operation so that the changes of the zoom magnification are constant between the average zoom magnification A and B.

While five special reproduction modes have thus been described, any one of these special reproduction modes may be specified for each scene as a display attribute. A plurality of these special reproduction modes may be used in combination. Further, the above special zoom reproduction effects have been described based on examples where a video is zoomed in from the wide end to the telephoto end. However, needless to say, the same processing is possible when a video is zoomed out from the telephoto end to the wide end.

In step S15, the system control unit 50 continuously controls, reproduces, and outputs recorded audio, irrespective of selection of reproduced and output frames. For example, the system control unit 50 appropriately adjusts the time axis and/or deletes unnecessary portions (silent or prolonged portions, for example).

Referring back to FIG. 8, after these output frames and audio are controlled as described above, in step S16, the reproduction and outputting processing is carried out. When necessary, the external I/F 54 supplies the reproduction signal to the external device connected thereto.

In step S17, if the system control unit 50 receives instructions to stop reproduction from the operation unit 52 or completes reproduction of the object to be reproduced (YES in step S17), the system control unit 50 ends the reproduction processing. If not (NO in step S17), the processing returns to step S11.

Figure 14:
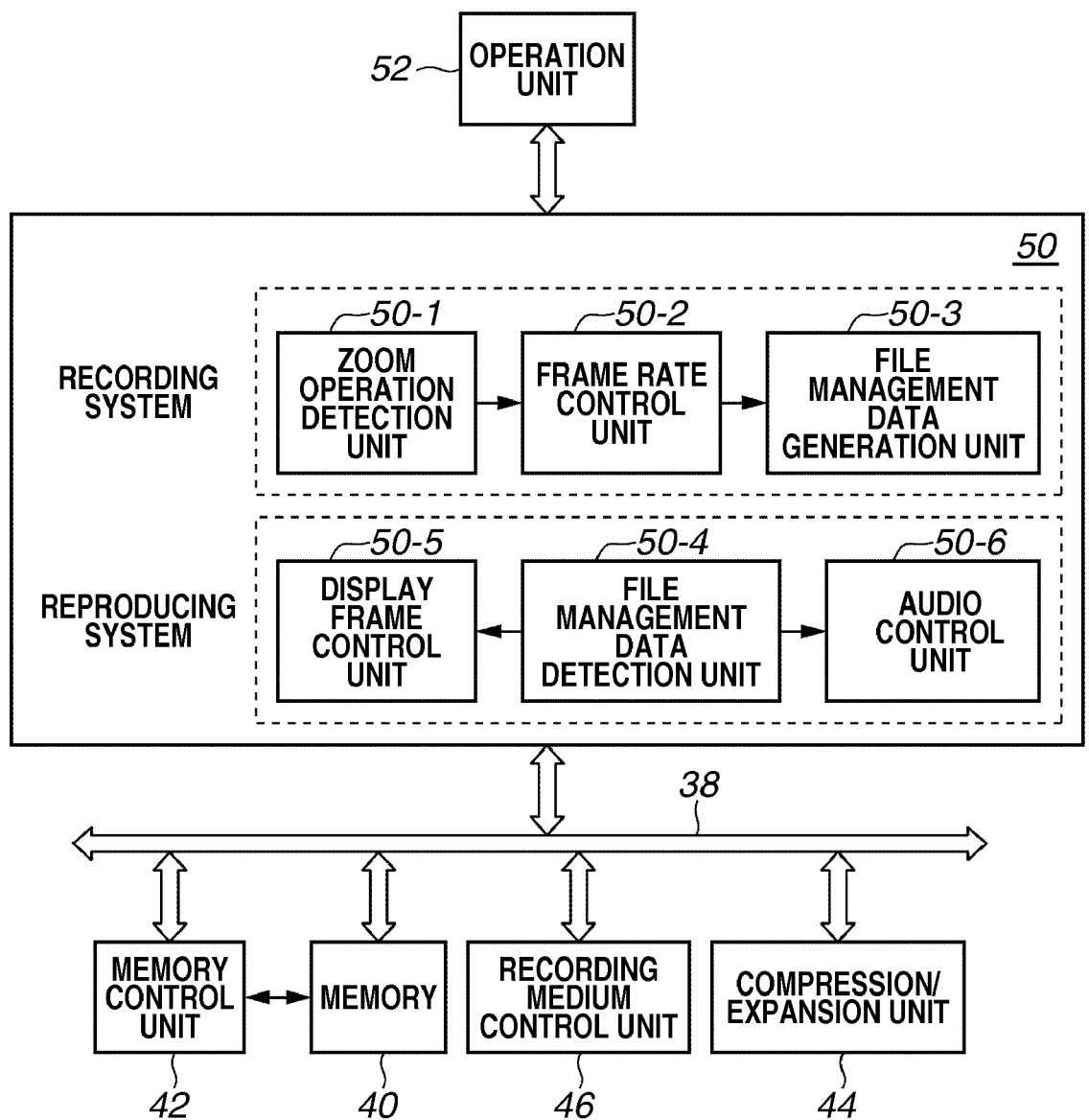
FIG. 14 is a block diagram illustrating functions of a system control unit 50.

FIG. 14 is a block diagram illustrating functions of the system control unit 50.

The system control unit 50 is connected to the operation unit 52 and also to the compression/expansion unit 44, the recording medium control unit 46, the memory 40, and the memory control unit 42 via the data bus 38. The system control unit 50 includes a zoom operation detection unit 50-1, a frame rate control unit 50-2, and a file management data generation unit 50-3 as a recording system. Further, the system control unit 50 includes a file management data detection unit 50-4, a display frame control unit 50-5, and an audio control unit 50-6 as a reproducing system.

During recording, the zoom operation detection unit 50-1 detects whether a zoom operation is carried out by the user and the zoom speed during a zoom operation. The zoom operation detection unit 50-1 supplies the detected zoom operation information to the frame rate control unit 50-2. The frame rate control unit 50-2 controls the recording frame rate, based on the zoom operation information supplied from the zoom operation detection unit 50-1.

The file management data generation unit 50-3 stores frame rate and zoom operation information about video data stored in the recording medium 48 in the file management data as metadata. Needless to say, the file management data generation unit 50-3 may store the recording frame rate and zoom operation information in another file different from an image file, as long as each frame of video data is associated with the recording frame rate and zoom operation information.

During reproduction, the file management data detection unit 50-4 reads the metadata about video data to be reproduced from the recording medium 48, and supplies the metadata to the display frame control unit 50-5 and the audio control unit 50-6. The display frame control unit 50-5 controls display frames as described above, based on the metadata supplied from the file management data detection unit 50-4 and a specified reproduction mode. Similarly, the audio control unit 50-6 controls output audio as described above, based on the metadata supplied from the file management data detection unit 50-4 and a specified reproduction mode.

As described above in detail, according to the present exemplary embodiment, frames captured during a zoom operation are recorded at a high frame rate, and during reproduction, based on a specified effect, certain frames are re-arranged on the time axis. In this way, videos during zoom operations can be reproduced and displayed with various display effects.

Since videos are captured at a high frame rate, frame images of a desired zoom magnification can be extracted, and high-quality and smooth interpolation can be realized. Additionally, even when a video captured during a zoom operation is visually undesirable because of a human error or the like during the zoom operation, by carrying out an interpolation process, the video can be reproduced without the undesirable portion. By separately processing the video and audio during such interpolation process, while some frames are skipped in the video, continuity of the audio can be maintained and reproduced without a break.

In the above exemplary embodiments, the camera unit constantly captures frames at a high frame rate, and the frame rate at which the frames are recorded in the recording medium 48 is decreased when necessary. However, the present invention is not limited to such example. For example, by changing the frequency of a timing signal output from the image sensor driving unit 28, even when the frame rate at which the camera unit captures frames is changed more flexibly, similar effects can be obtained.

While a video captured during a zoom operation often includes important scenes, similarly, videos captured before and after a zoom operation often include important scenes. Thus, irrespective of on/off of a zoom operation, frames are recorded at a high frame rate, to record video data captured during certain periods before and after the zoom operation in the recording medium 48 at a high frame rate. During reproduction, special reproduction effects similar to those of the first exemplary embodiment are applied to a zoom operation period and the periods before and after the zoom operation period. In this way, a video can be reproduced smoothly during a zoom operation period and the periods before and after the zoom operation period.

FIG. 15 illustrates a reproduction operation of the present exemplary embodiment. The horizontal axis represents time.

FIG. 15A illustrates on/off of a zoom operation during recording. FIG. 15B illustrates a frame control signal indicating a special reproduction period formed by a zoom operation period and the periods before and after the zoom operation period. Thus, the special reproduction period is formed by the zoom operation period illustrated in FIG. 15A, a period D1 before the zoom operation period, and a period D2 after the zoom operation period. FIG. 15C illustrates captured frames. FIG. 15D illustrates frames recorded in the recording medium 48.

As seen from FIGS. 15B and 15D, according to the present exemplary embodiment, in addition to the frames captured during a zoom operation, the frames captured during periods D1 and D2, which are before and after the zoom operation, are also recorded in the recording medium 48 at a high frame rate of 1/240-second intervals. The lengths of periods D1 and D2 may be different from each other.

To record frames captured during period D1, which is before the zoom operation, in the recording medium 48, a buffer memory capable of storing video data output from the camera signal processing unit 36 for more than period D1 is set in the memory 40 in advance.

If the start of a zoom operation is detected, frames captured during period D1, the zoom operation, and period D2 and recorded in the buffer memory 40 are encoded without changing the frame rate, and recorded in the recording medium 48. If the start of a zoom operation is not detected, frames captured after period D1 and stored in the buffer memory 40 are thinned at a frame rate of 1/60-second intervals. The resultant frames are then encoded and recorded in the recording medium 48.

FIG. 16 schematically illustrates a relationship between the recording frame rate and zoom magnification according to the present exemplary embodiment. The horizontal axis represents time and the vertical axis represents zoom magnification (angle of view of the image).

Double circles represent frames captured at 1/240-second intervals, and single circles represent frames captured at 1/60-second intervals. According to the present exemplary embodiment, the frames represented by the single circles and captured at 1/60-second intervals are recorded in the recording medium 48, irrespective of on/off of the zoom operation. In addition to the period between time t3 and time t9 when the zoom magnification changes, video data captured during the period between time t1 and time t3, which is before the zoom operation, and during the period between time t9 to time t11, which is after the zoom operation, is also recorded in the recording medium 48 at a frame rate of 1/240-second intervals, which is higher than normal rate.

Thus, according to the present exemplary embodiment, in addition to a zoom operation period, video is recorded in the recording medium 48 at a high frame rate during certain periods before and after the zoom operation period. Generally, when a user carries out a zoom operation, video captured before and after a zoom-in operation or a zoom-out operation includes a target object. Thus, the video includes important scenes that reflect the photographer's intention, and examples of such scenes include goal scenes in sports games and close-up facial expressions. By recording the video captured before and after a zoom operation at a high frame rate as described above, the video captured before and after the zoom operation can be displayed effectively.

While the above exemplary embodiments use an optical zoom, which optically zooms an optical image incident on the image sensor 26, the present invention may similarly be applicable to an imaging apparatus, which uses an electronic zoom that electronically zooms an image signal generated by the sensor 26.

The rate of a video signal has been described as a frame rate in the above description. However, in the case of an interlace signal, by replacing the frame rate with a field rate, similar effects can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-121535 filed May 20, 2009, which is hereby incorporated by reference herein in its entirety.

What is claimed is:

1. An imaging apparatus comprising:
   an imaging unit including an image sensor configured to convert an optical image to an image signal, and a zoom unit configured to optically zoom an optical image incident on the image sensor or electronically zoom an image signal output from the image sensor;
   a recording unit configured to record a video signal including an image signal captured by the imaging unit in a recording medium, and configured to record a recording frame rate, at which the video signal is recorded in the recording medium, and zoom operation information for the zoom unit in the recording medium;
   a zoom operation unit configured to operate the zoom unit;
   a control unit configured to control the recording frame rate at which the video signal is recorded in the recording medium based on an operation of the zoom operation unit, and configured to increase the recording frame rate to be higher than a normal frame rate during a period including a period when the zoom operation unit is operated; and
   a reproducing unit configured to reproduce the video signal from the recording medium based on a set reproduction mode, and configured to carry out thinning processing on the video signal during the period including the period when the zoom operation unit is operated based on the zoom operation information and reproduce the processed video signal at the normal frame rate.

2. The imaging apparatus according to claim 1, further comprising a zoom speed detection unit configured to detect a zoom speed of the zoom unit, wherein the control unit controls the recording frame rate based on the zoom speed detected by the zoom speed detection unit.

3. The imaging apparatus according to claim 1, wherein the period including the period when the zoom operation unit is operated includes only the period when the zoom operation unit is operated.

4. The imaging apparatus according to claim 1, wherein the period including the period when the zoom operation unit is operated includes the period when the zoom operation unit is operated and periods before and after the period.

5. The imaging apparatus according to claim 1, wherein a video signal that is captured at the normal frame rate and a video signal that is captured at other than the normal frame rate are separately stored and managed in different areas of the recording medium.

6. An imaging apparatus comprising:
   an imaging unit including an image sensor configured to convert an optical image to an image signal, and a zoom unit configured to optically zoom an optical image incident on the image sensor or electronically zoom an image signal output from the image sensor;

a recording unit configured to record a video signal including an image signal captured by the imaging unit in a recording medium, and configured to record a recording frame rate, at which the video signal is recorded in the recording medium, and zoom operation information for the zoom unit in the recording medium;

a zoom operation unit configured to operate the zoom unit; and a control unit configured to control the recording frame rate at which the video signal is recorded in the recording medium based on an operation of the zoom operation unit, and configured to increase the recording frame rate to be higher than a normal frame rate during a period including a period when the zoom operation unit is operated.

7. A reproducing apparatus comprising a reproducing unit configured to reproduce the video signal recorded by the imaging apparatus according to claim 6 based on a set reproduction mode, and configured to carry out thinning processing on the video signal during the period including the period when the zoom operation unit is operated based on the zoom operation information and to reproduce the processed video signal at the normal frame rate.

* * * * *